United States Patent Office 3,459,637
Patented Aug. 5, 1969

3,459,637
ENZYME DIGESTION OF NUCLEIC ACIDS
Louis Laufer and Sidney Gutcho, Bronx, N.Y., assignors to Schwarz Bioresearch, Inc., Orangeburg, N.Y.
No Drawing. Continuation of application Ser. No. 134,570, Aug. 29, 1961. This application Oct. 30, 1963, Ser. No. 319,955
Int. Cl. C12b 1/00
U.S. Cl. 195—28                    8 Claims This invention relates to new and useful improvements in the enzyme digestion of nucleic acids and is a continuation of our copending application, Ser. No. 134,570, filed Aug. 29, 1961, now abandoned. The invention more particularly relates to a novel source of enzymic material capable of digesting nucleic acids; the recovery of enzymic materials from this source; the material itself; the use of this material for hydrolyzing nucleic acids and the use of the material under specific, controlled conditions in order to obtain specific hydrolysis products.

As conductive to a clear understanding of this invention it should be noted that both RNA and DNA are polymeric molecules which occur widely in nature often in long chains ranging in molecular weight up to $10^6$ to $10^8$. It is presently thought that DNA polymers which are found primarily in the nucleus of cells are responsible for transmitting genetic information to succeeding generation of cells, whereas RNA polymers, found primarily in the cytoplasmic portion of cells, in various degrees of polymerization, are concerned with the synthesis of specific proteins required by the cells. Subunits of nucleic acids, especially the monomeric nucleotides of RNA are found within cells in a combination especially with many of the B vitamins, in which form they function as coenzymes, promoting specific reastion necessary for the normal function of the organism.

The polymeric structure of a nucleic acid and the relation of the polymer to the various possibile degradation products may be represented schematically in the following diagram:

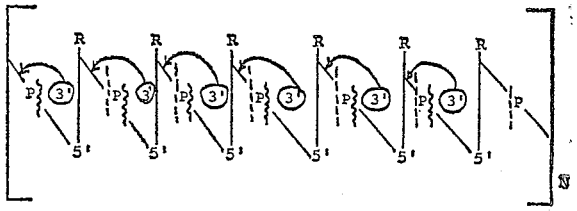

where: R may be purine or pyrimidine base, most commonly, in nature; adenine, guanine, uracil, cytosine or thymine. The vertical heavy line represents a five-carbon sugar in pyranose configuration; d-ribose in RNA and a d-2-deoxyribose in DNA and the numbers 3' and 5' represent respectively the third and fifth carbon of these sugars. P is a phosphate ester bridge connecting adjacent monomers through a linkage between the 3' and 5' carbons.

The polymer schematically shown may be degraded in many ways by a variety of enzymes which have been isolated from mammalian tissue, snake venom, and other living cells such as micro-organisms at an extremely high cost. The procedure is thought to be usually stepwise with certain alternative pathways. In the illustration above, the enzyme with activity responsible for reducing the size of N (shortening the chain length) is called a nuclease or deploymerase. Once this shortening is accomplished the phosphate bridges can be attacked specifically either at points indicated by the dotted lines, or at the wavy lines. In the former case monomeric units with phosphate esters attached to the 5' position (5'-nucleotides) are the sole product whereas in the latter the products are 3'-nucleotides. The name most commonly given to the enzyme having this type of enzymic activity is "diesterase." There is a specific enzyme for each point of attack. Nucleotides may be subsequently further degraded by the splitting off of phosphate (by 3' or 5' phosphomonoesterases) and by further cleavage of the base (R) from the sugar.

Enzymes which catalyze such hydrolysis are called nucleosidases. Finally, there is also enzyme activity in some cellular extracts which removes $NH_2$ radicals from bases which contain them. Such enzymes are referred to as deaminases.

It should also be noted that DNA molecules are believed to occur in the native state in the form of a double helix containing two complementary polymeric strands. One of the actions of deoxyribonucleases is to disengage these strands.

DNA and RNA are considered to be responsible for the infectivity of animal, plant, and bacterial viruses. Hence, modification of such native nucleic acids by partial or complete hydrolysis changes their infective properties.

It has also been reported that the enzymatic synthesis of DNA is greatly accelerated in vitro when partilly hydrolyzed fragments of DNA (oligonucleotides) are present. Many of the degradation products outlined above have become significant articles of commerce because of their importance in research studies on the chemistry and properties of DNA and RNA.

It is among the objects of this invention to provide a simple, economical, and expeditious means for preparing, in any quantity desired, enzymic materials capable of hydrolyzing both RNA and DNA.

Another object of this invention is to provide a method for preparing enzymic materials capable of hydrolyzing both RNA and DNA which is stable for long periods of time and which, by controlling the conditions under which it is employed, can attack either type of nucleic acid in predetermined manner to produce a preponderance of any one of a number of types of degradation products.

A further object of this invention is the use of the enzymic materials prepared in accordance with the invention for hydrolyzing RNA and DNA and the hydrolyzing of these materials under controlled conditions so as to obtain specific hydrolysis products.

These and still further objects will become apparent from the following descriptions:

In accordance with the invention, it has been surprisingly discovered that the rapidly proliferating parts, i.e. the rootlets and stems of germinating seeds, constitute a particularly rich source of enzymes which are capable of readily splitting both RNA and DNA and from which the enzymic material may be very simply and efficiently recovered by aqueous extraction. The proliferating rootlets are the richest source of enzymic material, the stems containing less, but useful quantities, whereas the seed or kernel itself does not contain a commercially interesting quantity. The property of the proliferating parts of the seed as a rich source of easily extractable enzymic material is a general property of seeds as a class and particularly monocotyledon seeds. Preferable seeds are those capable of being malted, such as oats, barley, wheat, corn, rye, mullet, sorghums, and rice, as well as many varieties of grasses, sunflower, peas and beans, acorns, melon seeds, including squash and cucumber, seeds of fruit such as apple, pear, tomato, pomegranate, and figs, and seeds of such tropical fruits as papaya, mango, locust bean and the like.

As certain seeds, such as barley, but also to a lesser extent wheat and rice, are commonly germinated in large quantities commercially, for the production of malt from which the rootlets are generally available as a by-product at low cost, the same are preferable for use in accordance with the invention and render the invention particularly interesting and valuable from a commercial standpoint.

Similarly, in some countries bean seeds are germinated for the production of bean sprouts, making available a cheap and plentiful supply of these rootlets for the practice of the invention.

We have found that there is little or no loss of enzyme activity if the rootlets or stems are dried, even if such drying is at relatively high temperature as is generally employed in kilning malt. Furthermore, the activity is retained in the rootlets for a number of years without any special storage precautions.

Some of the desired enzymes are readily extracted from such rootlets by simple comminution in water followed by separation of the solid residue by filtration, centrifugation, decantation or other convenient means in which certain other enzyme fractions are retained and recovered separately.

The solution so formed may be used directly, stored for considerable periods of time under refrigeration without loss of activity, or manipulated by various known techniques for the preparation of purer and more highly concentrated enzyme fractions.

As mentioned, economic considerations and ready availability favor dried rootlets of barley malt commercially known as "malt sprouts" as the preferred material but any readily available seed rootlets or sprout could be substituted, such as, for example, those from wheat malt, rice malt, or rye malt, or bean shoots, or any of those mentioned above.

The rootlets or sprouts may be pre-ground in any suitable mill prior to mixing with water or may be comminuted directly with the water. The proportion of solids to liquid should be sufficient to provide good extraction and may vary widely, but the preferred ratio is between 5 and 15 parts of water per part of solids. Temperature may vary from just above freezing to as much as 75 degrees C. The time of extraction does not seem to be critical and can vary from 3 minutes to 3 hours or more without significantly affecting the yield. Normally extracts are filtered within an hour after the mixing has been started.

Filtered extracts may be stored at 4 degrees C. or below for three months or more without loss of enzyme activity, provided precautions are taken to prevent infection by microorganisms.

A typical extract or rootlets in which 1 part of dry rootlets is extracted with 10 parts of water will contain between 2 and 6% total solids after clarification, approximately 50% of which is protein designated as 6.25 times the nitrogen content, the balance being carbohydrate material and ash. Preferably, this extract is used in proportion such that the ratio of crude protein in the extract to nucleic acid substrate is from 1:5 to 3:5.

The extract can be concentrated readily in vauco at temperatures below about 60 degrees C. at least 6 to 10 fold without loss of activity. A typical concentrate so prepared had an activity such that 0.3 ml. completely hydrolyzed 100 mg. of DNA in 24 hours at pH 7.4. Testing the same solution by the viscosimetric method of Christensen indicated an activity of about 800 units per ml.

It is a particular feature of the enzymic extracts prepared in this manner that they contain all of the activity necessary to perform all of the sequential steps described above in cluding depolymerization of the double-stranded macromolecular structure of DNA, followed by attack of the phosphate ester linkages. However, close control of the pH and other conditions set forth below permit direction of the attack to cleave either the 5′ linkage (wavy lines) or the 3′ linkage (dotted lines) thus producing respectively 3′ or 5′ nucleotides.

The enzymic activity of the extract may be tested by adding a measured amount of it to 1% solutions of DNA or RNA, adjusting the pH appropriately, and incubating the mixture at temperatures from 10 to 65 degrees C. and preferably from 15 degrees to 50 degrees C. for from 2 to 48 hours. Samples are withdrawn from time to time and analyzed for unreacted nucleic acid.

The enzymic material obtained in accordance with the invention has a broad spectrum of activity with respect to the nucleic acids but in accordance with a further embodiment of this invention, we have discovered that we can control this activity in order to obtain selective hydrolysis products. Thus, in accordance with the invention we may selectively obtain 5′ nucleotides by maintaining the pH of the enzyme solution in which the nucleic acid is incubated at a value between 8.5 and 9.5 and preferably at about 9.0 or conversely by maintaining the pH between about 4.5 to 7.4 primarly nucleosides are formed.

For the production of the 5′-nucleotides, the pH of incubation solution may be adjusted into the alkaline range specified with the use of an alkaline material, such as ammonium hydroxide, carbonate, sodium hydroxide, tris (hydroxy methyl) amino methane, primary, secondary, and tertiary amines which are water miscible, and the hydrolysis is generally completed in about 8–24 hours.

It has furthermore been surprisingly found that the presence of zinc ions in the incubating solutions accelerates the enzyme activity and that a concentration of zinc ions between about 0.001 to 0.01 M increases the rate of hydrolysis by 50–100%. Addition of other ions such as calcium, copper, or iron, however, appears to inhibit the nucleic acid hydrolysis when using the enzymic material obtained by the aqueous extraction of malt sprouts.

In actual practice an aqueous solution containing 0.1 to 5% of either ribonucleic or deoxyribonucleic acid is prepared by neutralizing a water suspension of the appropriate acid with ammonium hydroxide to a pH of 8.0 to 10.0. To the solution is added an equal volume of an aqueous extract of malt sprouts prepared by macerating 5 to 25% by weight of sprouts in water and removing the coarse particles. Enough zinc acetate is added to make the solution 0.001 M with respect to zinc ion. The pH of the mixed solutions is then readjusted to at least 9.0 and the solution is permitted to incubate at 37 degrees C. with frequent readjustment to keep the pH in the range 8.9 to 9.3 for 24 hours. Toluene is generally added to suppress bacterial action during incubation. After 24 hours the enzymes are destroyed by addition of excess ammonia raising the pH above 10.0 or by heat. At this point magnesium chloride can be added to the solution to precipitate and remove any small amount of phosphate ion which may be formed during hydrolysis. After removal of phosphate the solution is concentrated to about half of its original volume and an equal volume of alcohol is added. This step precipitates impurities including proteins and starches contained in the malt sprout extract but leaves the 5′-nucleotides in solution. The precipitated impurities are filtered off and the aqueous alcoholic solution is passed directly onto a column of a chloride anion exchange resin. All nucleotides are retained on the ion exchange column, from which, using appropriate eluting agents as known to the art each of the 5′-nucleotides can be eluted separately from the column, concentrated and crystallized from solution. In this manner are obtained, in yields averaging 40 to 75% of the theoretical amounts available, the following 5′-nucleotides: adenylic acid, guanylic acid, cytidylic acid, uridylic acid, deoxyadenylic acid, deoxyguanylic acid, deoxycytidylic acid, and thymidylic acid.

In the case of the production of the nucleosides, the pH may be adjusted to a value between about 4.5 to 7.5 with the use of ammonium hydroxide and completion of the hydrolysis generally takes about 24–40 hours. In practical operation, a 2% solution of nucleic acid, either ribonucleic or deoxyribonucleic acid is prepared by neutralization with ammonium hydroxide to pH 5.5; to the solution is added an equal volume of an aqueous extract of malt sprouts prepared by macerating 10% by weight of sprouts in water and filtering off the clear extract. The pH of the mixed solutions are then readjusted to about 5.5 and the solution is permitted to incubate at 37 degrees C. for 2 to 10 days.

After digestion the enzymes are destroyed by additions of either excess ammonia raising the pH above 10.0, or by addition of a small amount—50 parts per million—of a metal poison such as copper sulfate. Then barium hydroxide can be added to the solution to pH 9.0 to precipitate the phosphate ions formed during hydrolysis. The precipitate is removed by filtration. After removal of phosphate the solution is concentrated to about one tenth of its original volume, made ammonical to pH 10.0 and 4 volumes of alcohol are added. This step precipitates impurities from solution including protein, starches, inorganic salt and some of the guanosine. The precipitated impurities are filtered off and the aqueous alcoholic solution is diluted and passed directly onto a column of a carbonate anion exchange resin. All nucleosides are retained on the ion exchange column. By using appropriate eluting agents each of the nucleosides can be eluted separately from the column, concentrated, and crystallized from solution. In this manner we have obtained in yields varying from 25 to 75% of the theoretical amounts available the following nucleosides, adenosine, quanosine, cytidine, uridine, deoxyadenosine, deoxyguanosine, thymidine, deoxycytidine, and deoxyuridine.

In all cases the incubating solutions may contain a concentration of 0.1 to 5%, and preferably 1 to 3% of the nucleic acid and 0.025% to 3.0% and preferably 0.20 to 1.8% of the extracted enzymic material and should be maintained at a pH between about 4.0 and 9.5. The percentage of the enzymic material refers to the total quantity of material extracted during the aqueous extraction.

The following examples are given by way of illustration and not limitation.

EXAMPLE 1

35 grams of commercial "malt sprouts" are mixed with 350 ml. of water for three minutes in a Waring Blendor at room temperature. The suspension is passed through a double layer of cheese cloth on a funnel to remove coarse particles, and the turbid filtrate is then centrifuged to produce a substantially clear supernatant. The residues are washed, and the centrifuged clear washings added to the main supernatant solution. One part of the solution thus obtained, when added to 4 parts of 1% nucleic acid solution (either DNA or RNA) causes hydrolysis of 80% or more of the polymer to soluble degradation products in 24 to 48 hours at 37 degrees C.

EXAMPLE 2

10 lbs. of commercial dried malt sprouts are powdered in a hammer mill to 50 to 100 mesh size. This powder is stirred into 50 lbs. (6 gallons) of water at 35 degrees C and thoroughly mixed for 15 minutes. The slurry is then filtered through diatomaceous earth on a large crock suction filter, and the cake is washed with successive portions of water at the same temperature until the filtrate volume is about 10 gallons. This filtrate, when tested in a manner similar to Example 1 is found to contain similar DNA and RNA hydrolzing activity.

EXAMPLE 3

10 grams of rootlets separated from stems and seeds of a Montcalm barley which had been germinated in the laboratory for ten days were mixed with 100 ml. of water in a Waring Blendor for about five minutes and then the slurry was clarified and tested as in Example 1. Hydrolysis of RNA at pH 9 was 84% in 24 hours while DNA was hydrolyzed 100% at pH 6 in the same length of time as measured by the amount of material not precipitated by uranyl acetate.

EXAMPLE 4

10 grams of the de-rooted barley kernels from Example 3 were treated and tested in an identical manner. RNA was hydrolyzed 22% in 24 hours at pH 9 and DNA was hydrolyzed only 10% in the same length of time.

Similar experiments were conducted on the roots, kernels, and, where available, the stems of germinated Hannchen two-rowed barley, rye seeds, oats, and beans with the results reported as Examples 5 through 9 in the tabulation below.

TABLE 1

| Ex. | Enzyme source | Substrate | pH | Percent hydrolysis |
|---|---|---|---|---|
| 3 | Barley rootlets | RNA | 9.0 | 84 |
|   | do | DNA | 6.0 | 100 |
| 4 | Barley Kernels | RNA | 9.0 | 22 |
|   |   | DNA | 6.0 | 12 |
| 5 | 2 row barley rootlets | RNA | 9.0 | 77 |
|   |   | DNA | 6.0 | 100 |
|   |   | RNA | 6.0 | 100 |
| 6 | 2 row barley kernels | DNA | 9.0 | 14 |
|   |   | DNA | 6.0 | 20 |
|   |   | RNA | 6.0 | 42 |
| 7 | Rye grass rootlets | DNA | 9.0 | 70 |
|   | Rye grass stems | DNA | 9.0 | 56 |
|   | Rye grass kernels | DNA | 9.0 | 35 |
| 8 | Oat rootlets | DNA | 9.0 | 64 |
|   | Oat stems | DNA | 9.0 | 37 |
|   | Oat kernels | DNA | 9.0 | 7 |
| 9 | Snap bean rootlets | DNA | 9.0 | 49 |
|   | Snap bean stems | DNA | 9.0 | 41 |
|   | Snap bean kernels | DNA | 9.0 | 19 |

Examples showing the application and usefulness of this invention are tabulated below:

EXAMPLE 10

Barley malt rootlet extract was prepared by blending, for about three minutes in a Waring Blendor, 35 grams commercial malt sprouts and 350 ml. distilled water. The bulk of the solids was removed by filtration through several layers of cheesecloth. This extract was then used as the enzymic solution without any further purification except decantation from solids sedimented upon storage under toluene in the refrigerator. 2.5 ml. of this enzymic solution was added to a solution containing 100 mg. RNA and 0.1 ml. of 0.1 M $Zn^{++}$ ions, the pH was adjusted to 9.3–9 with concentrated $NH_4OH$ and the whole diluted to 10 ml. After 4 hours at 37 degrees, the pH was readjusted with $NH_4OH$ to 9.2 from 8.7 to which pH range the solution had fallen and incubation continued for a total of 21 hours. Analysis of the hydrolyzate then showed (1) 20% oligonucleotide (material precipitated by the uranyl aceate-trichloracetic acid reagent of Brawerman & Chargaff, JBC 210,445 (1954)), (2) 26% ribonucleosides measured by inorganic phosphorous liberated; and (3) 54% ribonucleotides calculated by difference.

EXAMPLE 11

Separate extracts were prepared from malt sprouts (rootlets) and the seeds from which these had been detached. Volumes of the recovered extracts were taken so that equivalent amounts of the initial solids were utilized. With 100 mg. DNA as the substrate in a total of 10 ml. solution made 0.001 M to $Zn^{++}$ ions and adjusted to pH 9.2 with $NH_4OH$, incubation was carried out at 37 degrees for about 18 hours. A pH readjustment to 9.2 was made at 2.5 hours. Assays of the hydrolyzate prepared with malt sprout extract showed 23% oligonucleotides by the uranyl acetate-TCA assay, 7% deoxyribonucleosides by assay for inorganic phosphorus, and 70% deoxyribonucleotides calculated by difference. Assays of the hydrolyzate prepared with the residual seeds, indicated 86% undegraded DNA while the inorganic phosphorus assay was unreliable due to a turbidity produced by the large amount of undegraded DNA.

EXAMPLE 12

In a pilot plant operation, 10 kilos of commercial RNA (about 90% pure) were taken for hydrolysis by malt sprout extract as outlined in the previous examples. Laboratory analyses of this hydrolyzate after 31 hours at 37 degrees and pH 8.9–9.1 showed approximately 30% undegraded RNA, 20% of the initially found phosphorus as inorganic phosphorus (nucleosides), and 50% 5'-ribonucleotides. The hydrolyzate was purified by removal of more than 90% of the liberated phosphorus and precipitation of non-nucleotide material with alcohol. Ion exchange chromatography of the resulting solution containing the equivalent of 7.45 kilos of RNA yield 2.25 kilos in the breakthrough (nucleosides) fractions or 22.5% of the initial material, 0.87 kilo cytidine 5'-phosphate, 1.25 kilos adenosine 5'-phosphate, 1.52 kilos uridine 5'-phosphate and 1.84 kilos guanosine 5'-phosphate (total recovery 7.734 kilos). Thus, a recovery of 5.48 kilos of 5'-ribonucleotides equivalent to about 60% of the initial substrate was obtained.

EXAMPLE 13

In a pilot plant operation, 10 kilos commercial DNA (about 88% pure) were taken for hydrolysis by malt sprout extract as outlined in the previous examples. The hydrolyzate after 31 hours at 37 degrees and pH 8.9–9.1 showed by analysis 17% undegraded DNA, 29% of the initially bound phosphorus as inorganic phosphorus (nucleosides), and 54% 5'-deoxyribonucleotides. The hydrolyzate was purified as outlined above. Ion exchange chromatography of this solution containing the equivalent of 7.95 kilos of DNA yielded 2.75 kilos in the breakthrough (nucleosides) fractions or 27.5% of the initial material, 0.71 kilo deoxycytidine 5'-phosphate, 0.97 kilo deoxyadenosine 5'-phosphate, 1.37 kilo thymidine 5'-phosphate, and 0.80 kilos guanosine 5'-phosphate (total recovery 6.60 kilos). Thus, a recovery of 3.85 kilos of 5'-deoxyribonucleotides equivalent to about 44% of the initial substrate was obtained.

EXAMPLE 14

8 kg. of commercial deoxyribonucleic acid (DNA) was dissolved in about 160 liters of water by adding ammonium hydroxide solution to the suspension and bringing the pH to 5.5. To this solution was added 320 liters of a malt sprout extract and the pH readjusted to 5.5. The malt sprout extract was prepared by finely grinding 65 kg. of malt sprouts, mixing the grind with 650 liters of water, letting the suspensions stand with slow mixing for 2 hours and then removing the solids by filtration. The filtrate is called the malt sprout extract (M.S.E.) The volume of the DNA and MSE solutions was adjusted to 600 liters, covered with toluene and incubated at 45 degrees C. for 10 days.

At the end of this time barium hydroxide was added to the solution to pH of 9.0 the precipitate of barium phosphate, unhydrolyzed barium DNA and other impurities was filtered off. The filtrate was collected and concentrated to about one tenth its volume, made ammoniacal to pH 10, and 4 volumes of alcohol was added. A precipitate was filtered off and washed with 80% alcohol. The filtrate was diluted with an equal volume of water and passed onto a carbonate anion exchange resin and nucleosides were eluted separately with use of controlled pH and ammonium carbonate buffers. Then separated nucleosides were each concentrated to low volume and recrystallized from solution. Yields were obtained as follows:

| | Grams |
|---|---|
| Deoxyadenosine | 250 |
| Thymidine | 950 |
| Deoxyuridine | 300 |

EXAMPLE 15

From 20 kg. of commercial DNA treated with an extract prepared from 67 kg. of malt sprouts incubated at 37 degrees C. for 3 days and then isolating the nucleosides as described in Example 14, the following yields were obtained:

| | Grams |
|---|---|
| Deoxycytidine | 170 |
| Deoxyadenosine | 475 |
| Thymidine | 2,250 |

EXAMPLE 16

RNA and DNA were hydrolyzed in the manner described in the previous examples using various sprouts, seeds, and stems as the enzyme source. The conditions of the hydrolysis and the results obtained are tabulated in Table 2 below:

TABLE 2

| Experiment No. | Substrate | Enzyme Source | Temp. (deg.) | Added Ions | Incubation time (hrs.) | Analytical data, percent | | |
|---|---|---|---|---|---|---|---|---|
| | | | | | | Undegraded | Nucleosides | Nucleotides |
| 1 | RNA | Malt sprout | 37 | None | 20 | 18.4 | 19.4 | 62.2 |
| 2 | RNA | do | 37 | 0.001 Ni++ | 20 | 14.1 | 22.8 | 63.1 |
| 3 | RNA | do | 37 | 0.01 M Ni++ | 20 | 32.6 | 19.4 | 48.0 |
| 4 | RNA | do | 37 | 0.001 M Zn++ | 20 | 5.0 | 29.7 | 69.3 |
| 5 | RNA | do | 37 | 0.01 M Zn++ | 20 | 17.6 | 37.7 | 44.7 |
| 6 | RNA | do | 37 | None | 24 | 32.6 | 14.8 | 52.6 |
| 7 | RNA | do | 37 | do | 24 | 29.5 | 16.0 | 54.5 |
| 6a | RNA | do | 37 | do | 48 | 24.8 | 19.4 | 55.8 |
| 7a | RNA | do | 37 | do | 48 | 24.8 | 21.7 | 53.5 |
| 8 | DNA | do | 37 | 0.001 M Zn++ | 19½ | 12.5 | 19.5 | 68.0 |
| 9 | DNA | do | 37 | 0.001 M Zn++ | 21½ | 25.4 | 12.4 | 62.2 |
| 10 | DNA | do | 37 | 0.001 M Zn++ | 4¾ | 43.0 | 9.7 | 47.3 |
| 11 | DNA | do | 50 | 0.001 M Zn++ | 4 | 48.3 | 7.6 | 44.1 |
| 12 | RNA | do | 50 | 0.001 M Zn++ | 4 | 7.0 | 19.2 | 73.8 |
| 13 | RNA | do | 37 | 0.001 M Zn++ | 5 | 28.0 | 17.1 | 54.9 |
| 14 | RNA | Green malt sprout | 37 | 0.001 M Zn++ | 19 | 31.6 | 19.6 | 48.8 |
| 15 | RNA | Green malt germinated seed | 37 | 0.001 M Zn++ | 19 | 67.1 | | 32.9 |
| 16 | RNA | Rye sprouts | 37 | 0.001 M Zn++ | 19 | 29.5 | 31.3 | 39.2 |
| 17 | RNA | Rye stems | 37 | 0.001 M Zn++ | 19 | 44.2 | | 55.8 |
| 18 | RNA | Rye seed, germinated | 37 | 0.001 M Zn++ | 19 | 65.0 | 8.5 | 26.5 |
| 19 | RNA | Oat stems | 37 | 0.001 M Zn++ | 21 | 63.3 | 15.9 | 20.8 |
| 20 | RNA | Oat rootlets | 37 | 0.001 M Zn++ | 21 | 36.4 | 11.5 | 52.1 |
| 21 | RNA | Oat seed, germinated | 37 | 0.001 M Zn++ | 21 | 92.7 | 10.7 | |
| 22 | RNA | Bean stems | 37 | 0.001 M Zn++ | 21 | 58.6 | 15.2 | 26.2 |
| 23 | RNA | Bean rootlet | 37 | 0.001 M Zn++ | 21 | 51.3 | 14.2 | 34.5 |
| 24 | RNA | Bean seed, germinated | 37 | 0.001 M Zn++ | 21 | 81.9 | 5.2 | 12.9 |

While the invention has been described in detail with reference to certain embodiments, various changes and modifications which fall within the spirit of the invention will become apparent to the skilled artisan. The invention is, therefore, only intended to be limited by the appended claims or their equivalents wherein we have endeavored to claim all inherent novelty.

We claim:

1. A process for hydrolyzing nucleic acids to form primarily 5'-nucleotides which comprises:
   incubating the nucleic acid to be hydrolyzed for from 2 to 48 hours in a hydrolysis solution containing the substantially solids-free aqueous extract of rapidly proliferating seed-parts selected from the group consisting of substantially seed-free comminuted germinating seed rootlets and substantially seed-free comminuted germinating seed stems;

maintaining the temperature of said hydrolysis solution at between 10 and 65° C. and the pH of said solution at between 8.5 and 9.5 during incubation whereby the nucleic acid is hydrolyzed primarily to 5'-nucleotides; and recovering said 5'-nucleotides from the incubated hydrolysis solution.

2. The process for hydrolyzing nucleic acids to form primarily 5'-nucleotides as claimed in claim 1 in which the rapidly proliferating seed-parts are derived from seeds selected from the group consisting of oats, barley, wheat, corn, rye, rice, grass, bean, pea, melon, papaya, locust bean, sunflower and sesame seeds.

3. The process for hydrolyzing nucleic acids to form primarily 5'-nucleotides as claimed in claim 1 in which the rapidly proliferating seed-parts are malted barley rootlets.

4. The process for hydrolyzing nucleic acids to form primarily 5'-nucleotides as claimed in claim 1 in which the pH of the hydrolysis solution is maintained at about 9.0.

5. The process for hydrolyzing nucleic acids to form primarily 5'-nucleotides as claimed in claim 1 in which the temperature of the hydrolysis solution during incubation is maintained at between about 15 and about 50° C.

6. The process for hydrolyzing nucleic acids to form primarily 5'-nucleotides as claimed in claim 1 in which the temperature of the hydrolysis solution during incubation is maintained at about 37° C.

7. The process for hydrolyzing nucleic acids to form primarily 5'-nucleotides as claimed in claim 1 in which the incubation is carried on for from about 8 to about 24 hours.

8. A method of obtaining 5'-mononucleotides, comprising the steps of extracting vegetable seed material of angiospermal origin and containing a 5'-phosphodiesterase active agent with an aqueous liquid so as to obtain a subtantially solids-free aqueous extract containing at least a portion of said 5'-phosphodiesterase active agent of said vegetable material; reacting nucleic acid with thus obtained 5'-phosphodiesterase active agent-containing extract without further purification of the latter so as to decompose said nucleic acid with the formation of 5'-mononucleotides; and recovering the thus formed 5'-mononucleotides.

References Cited
UNITED STATES PATENTS 3,301,767   1/1967   Laufer et al. _____ 195—28

OTHER REFERENCES

Cook, Barley and Malt, Biology, Biochemistry, Technology, Pub. by Academic Press, New York, 1962, pps. 432 and 433.

ALVIN E. TANENHOLTZ, Primary Examiner

U.S. Cl. X.R.

195—62, 66; 260—211